United States Patent [19]
Fujimaki et al.

[11] 4,009,305
[45] Feb. 22, 1977

[54] PROCESS FOR THE SURFACE TREATMENT OF CARBON FIBERS

[75] Inventors: Hiroto Fujimaki, Tokyo; Fumio Kodama, Choufu; Reiho Takabe, Kawasaki; Kiro Asano, Tokyo; Koji Seguchi, Fuchu, all of Japan

[73] Assignees: Kureha Kagaku Kogyo Kabushiki Kaisha, Tokyo; Toyo Boseki Kabushiki Kaisha, Osaka, both of Japan

[22] Filed: Dec. 20, 1973

[21] Appl. No.: 426,567

[30] Foreign Application Priority Data

Dec. 22, 1972  Japan ............................. 47-129062
Dec. 22, 1972  Japan ............................. 47-129063

[52] U.S. Cl. .............................. 427/399; 8/115.6; 264/DIG. 19; 423/447.1; 423/460; 427/444
[51] Int. Cl.² .......................................... B05D 5/00
[58] Field of Search .......... 117/46 CC, 46 CB, 118, 117/DIG. 11, 47 R, 106 C, 140 R, 22 S; 8/115.6; 264/DIG. 19; 106/307; 423/447.1, 460; 427/444, 399

[56] References Cited

UNITED STATES PATENTS

| 2,816,046 | 12/1957 | Damusis | 106/307 |
| 2,867,540 | 1/1959 | Harris | 106/307 |
| 3,317,339 | 5/1967 | Fortner et al. | 117/118 |
| 3,549,560 | 12/1970 | Monsimer | 106/307 |
| 3,627,570 | 12/1971 | Cass | 117/47 R |
| 3,660,140 | 5/1972 | Scola et al. | 117/47 R |
| 3,723,607 | 3/1973 | Kalnin | 423/447 |
| 3,776,829 | 12/1973 | Goan | 423/447 |

*Primary Examiner*—Ronald H. Smith
*Assistant Examiner*—Sadie L. Childs
*Attorney, Agent, or Firm*—Lane, Aitken, Dunner & Ziems

[57] ABSTRACT

A carbon fiber is oxidized to form oxygen-containing functional groups on the entire surface of the fiber and then contacted with ammonia, an organic amine, a lactam, or an amino carboxylic acid at a temperature of 100°–500° C whereby the surfaces of the carbon fiber obtain good affinity for a synthetic resin.

5 Claims, No Drawings

4,009,305

PROCESS FOR THE SURFACE TREATMENT OF CARBON FIBERS

FIELD OF THE INVENTION

This invention relates to a process for the surface treatment of carbon fibre, and more particularly, to a process for the surface treatment of carbon fibre imparting thereto good affinity for a synthetic resin which is used as a matrix of a composite material.

BACKGROUND OF THE INVENTION

Carbon fibre offers many advantages as a reinforcing material in that it generally has high mechanical strength and elasticity and low specific gravity, along with other excellent properties such as heat resistance, chemical resistance, electric conductivity, self-lubrication and the like. In producing a composite material (i.e., a fibre-reinforced plastic), a carbon fibre in the form of long or short fibre, or a woven fabric or a non-woven fabric is used in combination with a matrix of a synthetic resin. Resins suitable for such a matrix include thermoplastics resin such as polyacetals, polyamides, polyesters, acrylic resins, fluoro resins, polyvinylchloride resins and the like and thermosetting resins such as epoxies, phenolic, polyimides and the like. Such a composite material is versatile and may be used as a structural material, a heat-resistant material, an electrically-conductive material, or a friction resistant material. However, difficulties have been encountered in that carbon fibre has generally poor affinity for a synthetic resin, so that when mixed with a synthetic resin matrix, it is difficult to obtain a composite material having satisfactory physical or mechanical properties since the carbon fibre has low adhesion to or wettability with the matrix. Accordingly, it is common practice in the production of the composite material to pretreat the surfaces of a carbon fibre so as to improve the affinity of the carbon fibre for a synthetic resin. For example, in a well known oxidation method, the carbon fibre is oxidized in a liquid or gas medium to form oxygen-containing functional groups such as carboxyl groups, carbonyl groups, lactone groups and/or hydroxyl groups on the surface of the fibre and at the same time to increase the surface area of the carbon fibre. However, the oxidized carbon fibre is still deficient in affinity for synthetic resin and the resultant composite material using the oxidized carbon fibre is disadvantageously low in resistance to water since the functional groups formed on the surfaces of the carbon fibre are hydrophilic groups. Furthermore, the carbon fibre having surfaces thereof more or less acidified by the produced functional groups may attack a synthetic resin matrix during the production of a composite material. More specifically, where a polyacetal resin which is susceptible to attack by an acid is used as a matrix, the matrix resin and the ultimate composite product has reduced physical or mechanical properties.

Accordingly, there has been a strong demand for a method of treating surfaces of a carbon fibre to impart thereto an improved affinity for a synthetic resin matrix and excellent adhesion to the matrix, without adversely affecting the resultant composite material obtained therefrom.

SUMMARY OF THE INVENTION

It is therefore an object of the present invention to provide a process for the surface treatment of a carbon fibre for improving its affinity for a synthetic resin.

It is another object of the present invention to provide a process for the surface treatment of a carbon fibre by which the surfaces of the carbon fibre are imparted with improved adhesion to a synthetic resin matrix.

It is a further object of the present invention to provide a composite material obtained by the present process.

Other objects and advantages, and features of the present invention will become apparent from the following description.

It has now been discovered that, if carbon fibre is oxidized to form oxygen-containing functional groups over the entire surface area and the functional groups reacted with a suitable compound the result is a product having good affinity for a synthetic resin. Ammonia, organic amines, lactams and amino carboxylic acids are suitable for this purpose. A product which is obtained by interaction between one of these compounds and the functional groups on the fibre surfaces has excellent affinity for a synthetic resin.

According to the present invention, there is provided a process for the surface treatment of a carbon fibre, characterized by forming oxygen-containing functional groups on the surface of the carbon fibre by an oxidation treatment and reacting the functional groups with a compound selected from the group consisting of ammonia, organic amines, lactams and amino carboxylic acids at a temperature of 100° – 500° C. The resultant carbon fibre has excellent adhesion to synthetic resin matrices usually used in the production of a composite materials, and thus enables the production of a composite material having optimum physical and mechanical properties.

DETAILED DESCRIPTION OF THE INVENTION

In the present invention, a carbon fibre is first oxidized to form oxygen-containing functional groups on the surfaces thereof. The oxidation may be effected by any known method, e.g. a liquid phase oxidation method using a nitric acid aqueous solution, a chromic acid aqueous solution, a chromate aqueous solution, a bichromate aqueous solution, a permanganic acid aqueous solution, a permanganate aqueous solution, a hypochlorous acid aqueous solution, a hypochlorite aqueous solution or an aqueous hydrogen peroxide; an anodization method using electrolysis; and a gas phase oxidation method using water vapor, air, oxygen, ozone, or nitrogen oxide. On the surfaces of the carbon fibre thus treated are formed oxygen-containing functional groups such as carboxyl groups, carbonyl groups, lactone groups and/or hydroxyl groups. Needless to say, the oxidation treatment should not damage the carbon fibre per se and should not reduce the mechanical strength.

The functional groups which are formed on the surfaces of the carbon fibre are reacted with a compound such as ammonia, an organic amine, a lactam, or an amino carboxylic acid, under heat. The organic amine may be, for example, an amine such as aniline, triethylamine, pyridine, quinoline, ethylenediamine, hexamethylenediamine or the like, or an aminosilane such as γ-aminopropyltriethoxysilane, n-trimethoxysilylpropylethylenediamine, or the like. Suitable lactams include compound having a lactam structure such as ε-caprolactam, butyrolactam, ε-caprylactam, heptalactam and the like. The amino carboxylic acid is, for example, an aliphatic amino acid such as aminobutyric acid, aminovaleric acid, aminocaproic acid, or the like, or an aromatic amino acid such as aminomethylbenzoic acid, aminobenzoic acid, diaminobenzoic acid, benzoic acid amide or the like.

Where ammonia is used for the reaction, the oxidized carbon fibre is first introduced into a furnace at 100° – 500° C and then ammonia gas which is diluted with water vapor or air, or an inert gas such as of nitrogen or argon, or 100% ammonia gas is fed into the furnace. When an organic amine, a lactam, or an amino carboxylic acid is used, the oxidized carbon fibre is first introduced into a furnace at 100° –500° C and then the organic amine, lactam, or amino carboxylic acid, which has been heated and gasified under suitable sublimation temperature and vapor pressure conditions and which, if necessary, has been mixed with an inert carrier gas such as nitrogen or argon gas, is fed into the furnace for contact with the carbon fibre. Alternatively, the organic amine, lactam or amino carboxylic acid may be dissolved in a solvent such as water or an alcohol and the oxidized carbon fibre is immersed in the resultant solution so as to deposit the organic amine, lactam or amino carboxylic acid upon the surfaces of the fibre in an amount of about 0.01 – 10 weight %, based on the weight of the carbon fibre. After immersion the carbon fibre is then placed in a furnace at 100° – 500° C for reaction. In this connection, when the reaction temperatures are above 500° C, no reaction product will be obtained or, if obtained, the product will be thermally decomposed immediately. On the other hand, if the reaction temperatures are set below 100° C, the reaction would not proceed in a satisfactory manner. Accordingly, the reaction temperatures should be within a range of 100° – 500° C, preferably 100° – 400° C. The reaction time is not critical, but is generally within a range of 1 min to 5 hours, preferably 10 min to 60 min. The reaction is preferably effected in an atmosphere of an air or inert gas such as nitrogen or argon.

The particulars for the reaction mechanism and reaction product structure for the surface treatment of the oxidized carbon fibre are not known at the present time. In this connection, it should be noted that in the production of a composite material using a polyacetal resin as a matrix, when a carbon fibre which has been subjected to a prior art oxidation treatment is employed as a reinforcing material, the polyacetal resin becomes susceptible to thermal decomposition even at temperatures lower than the melting point of the resin since the carbon fibre is acidified due to oxygen-containing functional groups on the surfaces thereof and the polyacetal resin is susceptible to attack by an acid. Thus, it is difficult to obtain a composite material having satisfactory properties. On the contrary, the carbon fibre treated by the process of the present invention is not subject to such thermal decomposition of the resin and is capable of providing a uniform mixture with the polyacetal resin to give a composite material having excellent mechanical properties. From these facts, it is assumed that the reaction product is not an acidic substance and that it is a substance or compound capable of coupling with the resin matrix through a chemical reaction.

The process of the present invention is applicable to almost all carbonaceous fibres including graphite fibre. Furthermore, the carbon fibre which has been treated by the process of the present invention has an affinity for most synthetic resins. Particularly when the treated carbon fibre is employed as a reinforcement for a composite material having a matrix of a polyacetal resin, a polyimide resin or an epoxy resin, the product is a composite material which has excellent physical and mechanical properties.

The present invention will be further illustrated by the following examples which, however, should not be construed as limiting the present invention as defined by the appended claims.

EXAMPLE 1

100 g of a pitch-base carbon fibre which had been cut into an average length of 3 mm was immersed in about 1 l of a 1% sodium hypochlorite aqueous solution having a pH value of 5.5 at a temperature of 25° C for 1 hour, followed by sufficient washing and drying. Then, the thus dried carbon fibre was placed in a furnace, to which was fed nitrogen gas containing 30 vol % of ammonia at a flow rate of 3l/min for reaction with the fibre at 300° C for 15 min. Thereafter, 100 g of polyacetal resin powder (Celcon M-90 produced by Celanese Corp.) was mixed (as a resin matrix) with 25 g of the treated carbon fibre by means of a Henschel mixer. At this stage, the carbon fibre has an average fibre length of shorter than 0.5 mm. The resultant mixture was fully dried and introduced into a mold having a size of 10 cm (width) × 10 cm (length) × 3 mm (thickness). The mold was heated by means of a hot press machine to 200° C for molding under a pressure of 180 kg/cm² when the temperature reached 200° C.

The resultant molding was cut into test pieces, each having a size of 3 mm (thickness) × 12.7 mm (width) × 100 mm (length), which were tested for three point bending strength by the method as prescribed in ASTM-D 790 and for Izod impact strength in accordance with the method as prescribed in ASTM-D 256.

For comparative purposes, two different moldings were prepared in the same manner as mentioned above, but using un-treated carbon fibre and sodium hypochlorite-treated carbon fibre. The two moldings were cut into test pieces having the same size and subjected to the same measurements as mentioned above. The test results are shown below.

| Carbon Fibre | Flexural Strength kg/cm² | Izod Impact Strength (un-notched)kg.cm/cm |
|---|---|---|
| Un-treated | 820 | 15.8 |
| Oxidized | — | — |
| Treated by Process of Invention | 1250 | 30.4 |

With only the oxidation treatment, i.e., the treatment by sodium hypochlorite alone, the polyacetal resin used as the resin matrix was thermally decomposed without producing the desired composite material.

The above process and the comparative process were repeated except that the polyacetal was replaced by a nylon resin. The resultant moldings were formed into test pieces, the mechanical strengths of which were determined in the same manner as mentioned above. The test results are shown below.

| Carbon Fibre | Flexural Strength kg/cm² | Notched Izod Impact Strength kg.cm/cm |
|---|---|---|
| Un-Treated | 1350 | 5.5 |
| Oxidized | 1550 | 5.0 |
| Treated by Process of Invention | 1630 | 5.9 |

It will be apparent from the foregoing test results that the surface treatment of the present invention contributes to stabilization of the matrix resins and to improvement of the adhesion of the carbon fibre to the resin matixes, resulting in remarkable increase in the mechanical strength of the composite materials.

EXAMPLE 2

The same type carbon fibre as used in Example 1 was oxidized in an atmosphere of air in a furnace at 350° C for 3 hours, to which was then fed nitrogen gas containing 10 vol % of ammonia at a flow rate of 3l/min for contact with the fibre at 250° C for 30 min. The resultant fibre was mixed with a polyacetal resin used as a resin matrix, which was molded and formed into test pieces in the same manner as in Example 1. The test pieces were subjected to the same tests as in Example 1. The test results are shown below.

| Carbon Fibre | Flexural strength kg/cm² | Izod Impact Strenght (un-notched) kg.cm/cm |
|---|---|---|
| Un-Treated | 820 | 15.8 |
| Oxidized | — | — |
| Treated by Process of Invention | 1180 | 31.5 |

With the air-oxidized treatment, the polyacetal resin was thermally decomposed and the desired composite material could not be obtained. Thus, air-oxidation proved unsuitable for the surface treatment of carbon fibre.

EXAMPLE 3

The same type of pitch-base carbon fibre as used in Example 1 was further heated at 2000° C in an atmosphere of argon and the resultant fibre was cut into an average length of 3 mm. The cut fibre was immersed in a 2% sodium hypochlorite aqueous solution having a pH value of 5.5 at 30° C for 1 hour, followed by sufficient washing and drying.

Then, the dried carbon fibre was placed in a furnace, to which was fed triethylamine entrained by nitrogen carrier gas for contact with the fibre at 250° C for 40 min.

The resultant fibre was mixed with a resin matrix of a polyacetal resin, which was molded and formed into test pieces in the same manner as in Example 1. The test pieces were subjected to measurements of mechanical strength as in Example 1.

The above process was repeated except that un-treated carbon fibre and oxidized carbon fibre were used, respectively. The test results are shown below.

| Carbon Fibre | Flexural Strength kg/cm² | Izod Impact Strength (un-notched) kg.cm/cm |
|---|---|---|
| Un-Treated | 850 | 16.5 |
| Oxidized | — | — |
| Treated by Process of Invention | 1270 | 29.5 |

The three types of carbon fibres, i.e., the nontreated, the oxidized and that treated by the process of the present invention, were respectively mixed with a resin matrix of an epoxy resin with sufficient agitation in a concentration of 50 vol %, and the resultant mixtures were molded at 180° C. The resultant moldings were each formed into test pieces to determine the flexural strength. The test results are shown below.

| Carbon Fibre | Flexural Strength kg/cm² |
|---|---|
| Un-Treated | 890 |
| Oxidized | 970 |
| Treated by Process of Invention | 1090 |

EXAMPLE 4

100 g of the same kind of carbon fibre as used in Example 1 was oxidized in the same manner as in Example 1 and immersed in a 0.1% (by weight) γ-aminopropyltriethoxysilane aqueous solution. Then, the immersed fibre was withdrawn from the solution and the solution was squeezed out from the fibre to such a degree as to make the total weight of the fibre and the immersing solution 200 g. Then, the carbon fibre was thermally treated in a furnace in an atmosphere of air at 100° C for 3 hours.

Thereafter, the procedure of Example 1 was repeated using a polyacetal resin as a resin matrix.

For comparative purposes, the above process was repeated except that un-treated and oxidized carbon fibre were used respectively. The test results are shown below.

| Carbon Fibre | Flexiral Strength kg/cm² | Izod Impact Strength (un-notched) kg.cm/cm |
|---|---|---|
| Un-Treated | 850 | 16.5 |
| Oxidized | — | — |
| Treated by Process of Invention | 1300 | 33.0 |

EXAMPLE 5

The same kind of the carbon fibre as used in Example 1 was oxidized in the same manner as in Example 1 and was immersed in 1l of a 5% (by weight) ε-caprolactam aqueous solution. After sufficient immersion, the carbon fibre was withdrawn from the solution and the solution squeezed out from the fibre to make the total weight 200 g. Then, the carbon fibre was introduced into a furnace for treatment in an atmosphere of nitrogen at 270° C for 40 min.

Then, the procedure of Example 1 was repeated using a polyacetal resin as a resin matrix.

For comparative purposes, the above process was repeated except that un-treated and oxidized carbon fibres were used, respectively. The test results are shown below.

| Carbon Fibre | Flexural Strength kg/cm$^2$ | Izod Impact Strength (un-notched) kg.cm/cm |
|---|---|---|
| Un-Treated | 820 | 15.8 |
| Oxidized | — | — |
| Treated by Method of Invention | 1265 | 29.5 |

Furthermore, the above process was repeated using of a nylon resin as a matrix together with un-treated carbon fibre, oxidized carbon fibre and a carbon fibre treated by the process of the invention. The test results are shown below.

| Carbon Fibre | Flexural Strength kg/cm$^2$ | Notched Izod Impact Strength kg.cm/cm |
|---|---|---|
| Un-Treated | 1350 | 5.5 |
| Oxidized | 1550 | 5.0 |
| Treated by Method of Invention | 1700 | 5.9 |

As is apparent from the above Table, the surface treatment of the present invention is remarkably effective in comparison with the mere oxidation treatment.

EXAMPLE 6

The same type of the carbon fibre as used in Example 1 was oxidized in a furnace in an atmosphere of air at 350° C for 3 hours. Powdered ε-caprolactam was dropped on a heating plate of 300° C at a rate of 1 g/min for sublimation and mixed with nitrogen gas. The sublimed lactam-containing nitrogen was fed to the furnace at 300° C at a flow rate of 1l/min for treating the carbon fibre for 30 min.

The procedure of Example 1 was then repeated using a polyacetal resin as the matrix. The test results are shown below.

| Carbon Fibre | Flexural Strength kg/cm$^2$ | Izod Impact Strength (un-notched) kg.cm/cm |
|---|---|---|
| Un-treated | 820 | 15.8 |
| Oxidation | — | — |
| Treatment by Method of Invention | 1285 | 31.7 |

With the air oxidized fibre, the polyacetal resin thermally decomposed. The air oxidation again proved unsuitable for use as a surface treatment.

EXAMPLE 7

The same type of the carbon fibre as used in Example 3 was further oxidized in the manner of Example 3. The resultant carbon fibre was immersed in a 2% (by weight) p-aminomethylbenzoic acid methanol solution. Then, the carbon fibre was withdrawn from the solution and the deposited solution was squeezed out from the carbon fibre until the weight of the adhering solution became equivalent to that of the fibre. Then, the resultant fibre carbon was placed in a furnace and treated in an atmosphere of nitrogen at 320° C for 30 min.

Thereafter, the same procedure as in Example 1 was repeated using a polyacetal resin for molding and, formation of test pieces, followed by determination of the mechanical strengths of the test pieces.

For comparative purposes, the above process was repeated except that an un-treated carbon fibre and an oxidized carbon fibre were used, respectively. The test results are shown below.

| Carbon Fibre | Flexural Strength kg/cm$^2$ | Izod Impact Strength (un-notched) kg.cm/cm |
|---|---|---|
| Un-Treatment | 850 | 16.5 |
| Oxidation | — | — |
| Treatment by Method of Invention | 1190 | 28.3 |

The above process was repeated except that the above-mentioned three carbon fibres were respectively mixed with an epoxy resin as a matrix in an equivalent volume ratio, and the mixtures were molded at 180° C.

The resultant moldings were formed into test pieces for determination of the bending strength in the manner previously described. The test results are shown below.

| Carbon Fibre | Flexural Strength kg/cm$^2$ |
|---|---|
| Un-Treatment | 890 |
| Oxidation | 970 |
| Treatment by Method of Invention | 1060 |

What is claimed is:

1. A process for the surface treatment of a carbon fibre which comprises oxidizing the surfaces of said carbon fibre to form oxygen-containing functional groups on said surfaces and then reacting said oxygen-containing functional groups with a compound selected from the group consisting of ammonia, organic amine, lactam and aminocarboxylic acid at a temperature of 100° – 500° C for a time period within the range of 1 minute to 5 hours.

2. A process according to claim 1, wherein said temperature is within a range of 100° – 400° C.

3. A process according to claim 1, wherein said organic amine is selected from aniline, triethylamine, pyridine, quinoline, ethylenediamine, hexamethylenediamine, γ-aminopropyltriethoxysilane, and n-trimethoxysilylpropylethylenediamine.

4. A process according to claim 1, wherein said lactam is selected from ε-caprolactam, butyrolactam, ε-caprylactam, and heptalactam.

5. A process according to claim 1, wherein said aminocarboxylic acid is selected from aminobutyric acid, aminovaleric acid, aminocaproic acid, aminomethylbenzoic acid, aminobenzoic acid, diaminobenzoic acid and benzoic acid amide.

* * * * *